United States Patent
Beerwerth et al.

(10) Patent No.: US 6,195,581 B1
(45) Date of Patent: Feb. 27, 2001

(54) PROCESS FOR EVALUATING THE SIGNAL OF AN INFRARED THERMOMETER, AND INFRARED THERMOMETER

(75) Inventors: Frank Beerwerth, Runkel-Ennerich; Klaus Heubach, Bad Camberg; Manfred Kaiser, Karben; Bernhard Kraus, Braunfels; Katja Honnefeller, Friedrichsdorf; Heinz Richter, Bad Soden; Albrecht Jestädt, Friedrichsdorf; Heinz Bültges, Eppstein, all of (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 09/077,064

(22) PCT Filed: Nov. 18, 1996

(86) PCT No.: PCT/EP96/04932

§ 371 Date: May 18, 1998

§ 102(e) Date: May 18, 1998

(87) PCT Pub. No.: WO97/19331

PCT Pub. Date: May 29, 1997

(30) Foreign Application Priority Data

Nov. 18, 1995 (DE) .............................. 195 43 096
Jan. 8, 1996 (DE) .............................. 196 00 334

(51) Int. Cl.$^7$ ...................................... A61B 5/00
(52) U.S. Cl. ............................................ 600/474
(58) Field of Search .................... 600/474, 475, 600/549, 473, 300; 374/100, 101, 102, 103, 104, 121

(56) References Cited

U.S. PATENT DOCUMENTS

| 3,738,173 | * | 6/1973 | Sato | 73/362 |
|---|---|---|---|---|
| 3,738,479 | * | 6/1973 | Sato | 206/16.5 |
| 3,905,232 | * | 9/1975 | Knute | 73/362 |
| 4,784,149 |   | 11/1988 | Berman et al. . | |
| 5,066,142 |   | 11/1991 | DeFrank et al. . | |
| 5,645,350 | * | 7/1997 | Jang | 374/158 |
| 5,935,058 | * | 8/1999 | Makita et al. | 600/200 |
| 6,002,482 | * | 12/1999 | Rothfritz et al. | 356/351 |
| 6,097,979 | * | 8/2000 | Janotte | 600/474 |

FOREIGN PATENT DOCUMENTS

| 0337724 A2 | of 1989 | (EP) . |
|---|---|---|
| 0445784 A2 | 9/1991 | (EP) . |
| 0472490 A1 | 2/1992 | (EP) . |
| 0502277 A2 | 9/1992 | (EP) . |
| 0565123 A1 | 10/1993 | (EP) . |
| WO95/00067 | 1/1995 | (WO) . |

* cited by examiner

Primary Examiner—Marvin M. Lateef
Assistant Examiner—Eleni Mantis Mercader
(74) Attorney, Agent, or Firm—Hopgood, Calimafde Judlowe & Mondolino

(57) ABSTRACT

The invention is directed to a method of evaluating the signal of an infrared thermometer for measuring human body temperature, in which the infrared thermometer includes a probe adapted to receive thereon a probe cover or protective film sufficiently transparent to infrared radiation, and in which on a measuring operation performed with the probe cover or protective film in "installed" condition the signal is evaluated, so that a measuring operation is performed also when the probe cover or protective film is not installed, with an appropriate allowance being made for the consequently more intensive infrared radiation by different signal evaluation.

20 Claims, 2 Drawing Sheets

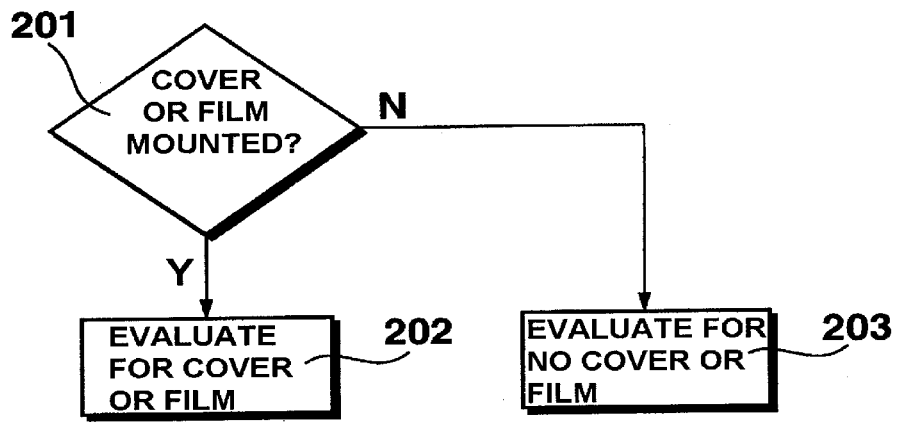
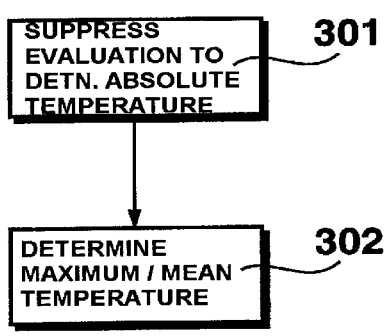
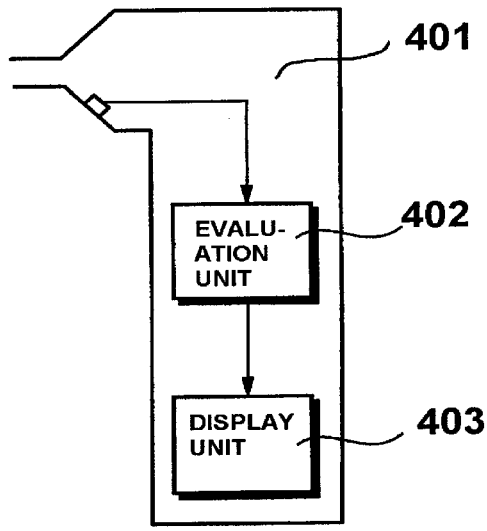

PROCESS FOR EVALUATING THE SIGNAL OF AN INFRARED THERMOMETER, AND INFRARED THERMOMETER

BACKGROUND OF THE INVENTION

This invention relates to an infrared thermometer and to a method of evaluating the signal supplied by an infrared sensor of an infrared thermometer.

THE STATE OF THE ART

An infrared radiation thermometer measures the infrared radiation emitted by the object of measurement in the direction of the thermometer. With conventional total or band radiation pyrometers, the temperature of the object is determined from the intensity of this radiation. In these devices, the infrared radiation is collected with an optical unit that includes an optical waveguide and, where applicable, a lens, mirror or the like, and is directed to an infrared sensor. Therefore, the indicated temperature can be determined correctly only if proper functioning of the optical unit is ensured.

It is known in the art to provide the probe of a clinical infrared thermometer with an exchangeable probe cover which is sufficiently transparent to infrared radiation. The clinical thermometer is intended for measuring temperature in the ear, for example. This means that the thermometer's probe is introduced into the ear for temperature measurement at this site.

The probe cover serves the purpose of protecting the thermometer from contamination. Such contamination could be caused by ear wax, for example, forming a heat bridge between the optical waveguide and the probe's outer wall by clogging the air gap conventionally existing at this location. This air gap thermally insulates both the sensor and the optical waveguide against the outer wall. When a measurement is being taken, this outer wall contacts the skin and therefore heats comparatively rapidly. To prevent heating of the infrared sensor and an attendant corruption of the received signal, said air gap is provided at the tip of the probe between the optical waveguide in the interior of the probe and the probe's outer wall. Therefore, any contamination occurring at this site could corrupt the measurement signal.

Further, the probe cover serves to prevent diseases from being transmitted, for example by fitting the thermometer, after a patient's temperature is taken, with a new probe cover before using it for another patient.

From EP-A-0565123, WO-A-95/00067 and EP-A-0445784 infrared thermometers are known in which for the reasons stated it is necessary to place a probe cover over the probe for measuring temperature, otherwise no temperature reading can be taken. This is particularly inconvenient in cases when a medical emergency situation has occurred but no temperature reading can be taken just because a probe cover is not on hand. In the infrared thermometer known from EP-A-0445784, the optical waveguide is sealed tight by a window, and no air gap exists at the forward end of the optical waveguide between the optical waveguide and the probe's outer wall.

SUMMARY AND OBJECTS OF THE INVENTION

It is an object of the present invention to provide an infrared thermometer and a method of evaluating the signal supplied by an infrared sensor of an infrared thermometer, which enhances its handling capabilities.

This object is accomplished with an infrared thermometer and a method according to claim 5.

In an advantageous feature, the infrared thermometer according to claim 1 includes an optical waveguide sealed tight by a window at a forward end of its probe, as well as a detector operating, for example, according to capacitive, optical, magnetic or mechanical principles and detecting the presence of a probe cover on the probe. The infrared thermometer may be operated both with and without probe cover or protective film because it is on the basis of the signal supplied by the detector that its evaluation unit performs the evaluation of a signal arriving from an infrared sensor according to either a first or a second approach.

By configuring the probe according to the present invention, use of the thermometer without probe cover cannot adversely affect the accuracy of measurement because the probe is designed to afford ease of cleaning. In particular ear wax, for example, cannot accumulate in a gap between the outer wall and the optical waveguide because the connection of these parts does not provide a gap towards the outside. Thus an infrared thermometer is obtained which is also operable without probe cover or protective film.

On the other hand, however, it is also possible for an infrared thermometer that is to enable operation both with and without probe cover or protective film to be equipped advantageously with such a probe. Advantageously, the contact areas between the window and the outer wall and, where applicable, the optical waveguide are not too large so that the conduction of heat via these heat bridges is largely reduced.

With regard to the bandwidth of a good transmission or a low emission within the relevant wavelength range, materials such as germanium, gallium arsenide, zinc selenide, chalcogenide glass, silicon, polyethylene, polypropylene, and copolymers of polyethylene and polypropylene have proven to be advantageous for the window.

By configuring the probe with an air gap between the optical waveguide and the outer wall it proves to be an advantage that a comparatively low amount of heat only is allowed to flow via the air gap from the outer wall to the optical waveguide.

With a configuration having at least one thermal mass formed by a metal block is provided in the area of the optical waveguide and/or the infrared sensor and connected to the optical waveguide and the infrared sensor it proves to be advantageous that the coupling of the thermal masses effects a reduction of the speed of the temperature variation with time, as well as of the temperature gradient.

In the method in which the measuring operation is executed when no probe cover or protective film is installed and an appropriate allowance is made for the infrared radiation that is consequently more intensive than when a measurement is take with the probe cover or protective film in place, it shows that a signal evaluation and hence a determination of temperature are possible regardless of whether or not a probe cover or protective film is installed over the probe. By contrast, in thermometers known in the art it has only been known to suppress the signal evaluation in the absence of a probe cover. The method disclosed in claim 5 enables operation of the thermometer with or without probe cover installed, as desired. This enables the thermometer to be operated without probe cover for domestic use, that is, when the number of persons for which the thermometer is used is limited. On the other hand, when the thermometer is used in a hospital, it can be operated also with probe cover to prevent diseases from being transmitted.

This results in a simplified thermometer manufacture because the requirement of having to differentiate between thermometers for domestic and hospital use is obviated.

The possibility afforded by using the thermometer also without probe cover reduces operating cost and waste. Further, its serviceability is enhanced because a measurement can be taken also when probe covers are not available.

The method where compensation is made for the absence or presence of a probe cover or protective film by multiplying the measured signal by a specified factor indicates a comparatively simple possibility of making allowance for whether or not the probe is used with a probe cover during measurement. In the use of a probe cover or protective film, the infrared signal to be detected is attenuated. To compensate for the reduced transmission, the sensor signal—conventionally the measured infrared radiation intensity—is multiplied by a factor that is determined in dependence upon the transmission of the probe cover or protective film and amounts to about 1.08 to 1.2 with the thin polyethylene or polypropylene film materials customarily employed.

In contrast, the method of compensating for the absence or presence of a probe cover or protective film by multiplying the measured signal by a variable factor dependent upon the ambient temperature and the temperature of the object being measured, enables greater precision in the adjustment of the sensor signal, which is accomplished in that the transmission of the probe cover or protective film is determined in dependence upon the ambient temperature and the temperature of the object being measured.

In the method in which the measuring operation is executed when no probe cover or protective film is installed and an appropriate allowance is made for the infared radiation that is consequently more intensive than when a measurement is take with the probe cover or protective film in place and no evaluation of the signal is made at the beginning of the measuring operation during a predetermined period of time, allowance is made for the possibility that the user has not yet properly positioned the thermometer within a first time period which is typically of the order of 1 s or 2 s. Measuring errors occurring due to such a condition can be avoided if during this first time period no evaluation of the measurement signal takes place. This first time period may be a preset fixed value or, for example, it may be determined by the characteristic of the sensor signal.

Advantageously, the first time period starts with the actuation of a button or a switch of the thermometer. Having this first time period start when a temperature rise can be concluded from the sensor signal may also be contemplated. When the thermometer is placed in the ear, the detected temperature initially rises until the measurement process has built up to a level at which the actual temperature is measured. Accordingly, this first time period may start when the detected temperature shows such a rise.

The determination of the length of this first time period by the signal characteristic may be performed advantageously by evaluating the rise of the measured temperature with time. During the time when the measurement process is in a transient state, the temperature experiences a relatively steep rise. A criterion for the end of the transient state then consists in that the variation of temperature with time is smaller than or equal to zero. The criterion for the termination of the first time period may then consist in that the first derivative of the temperature with respect to time is below a predetermined threshold value, for example, smaller than or equal to zero.

Advantageously, this approach for determining the length of the first time period may be limited to measurements taken without probe cover or protective film. When a thermometer on which a probe cover or protective film is installed is placed in the ear, relatively intense heat develops in the probe cover or protective film at the beginning of measurement. As a result, infrared energy is again radiated off the probe cover or protective film. The temperature rise with time thus does not enter a point of "saturation" but continues its rise, though in a less distinct fashion. A criterion for the termination of the first time period may then not be derivable with sufficient accuracy.

It will be understood, of course, that in the method where no evaluation of the signal is made at the beginning of the measuring operation during a predetermined period of time, the possibility also exists to make the first time period dependent on the presence or absence of a probe cover or protective film.

In the method in which the measuring operation is executed when no probe cover or protective film is installed and an appropriate allowance is made for the infrared radiation that is consequently more intensive than when a measurement is take with the probe cover or protective film in place and several measurement values are made during a measuring operation and evaluation of the received signal refers to the measurement value for evaluation that corresponds to the maximum temperature, it shows to advantage that it is irrelevant whether the user holds the thermometer in the proper position at a particular moment. Rather, such a method, several measurement values are picked up, using for further evaluation the measurement value that corresponds to the maximum temperature.

This prevents measurement errors from occurring should the user hold the thermometer too far away from the point of measurement. If the signal measured at such an instant were evaluated, a temperature lower than the one actually prevailing would be measured.

Advantageously, the suppression of signal evaluation for the determination of an absolute temperature during the first time period may be omitted because resulting measurement errors cannot occur with this evaluation method.

Overall, therefore, the evaluation method just referenced is especially suitable for measurements that are taken with a probe cover or protective film mounted. With the evaluation method just referenced it is irrelevant whether the first time period is determined correctly, which for the reasons set forth in the foregoing may give rise to problems when a reading is taken with the probe cover or protective film installed.

In the method in which the measuring operation is executed when no probe cover or protective film is installed and an appropriate allowance is made for the infrared radiation that is consequently more intensive than when a measurement is take with the probe cover or protective film in place and upon initiating a measuring operation measurement values are picked up during a specified interval of time and the determination of the temperature of a mean value of these measurement values is formed, in which measurement values are picked up during a specified interval following which a mean value of these measurement values is formed in the evaluation, it shows to advantage that the errors described in the foregoing may be likewise avoided. The specified interval may be of the order of magnitude of some seconds, in particular from two to four seconds.

It is particularly advantageous in this method to leave the measurement values unconsidered during the first time period when no evaluation is made at the beginning as described before, thereby preventing them from corrupting the measurement result. In this event, therefore, the specified interval succeeds the first time period.

Accordingly, the method wherein a mean value is used is suitable for use with particular advantage when a measurement is taken without probe cover or protective film, because then a relatively reliable determination of the first time period is possible in accordance with the explanations given in connection with claim 8.

It will be understood, of course, that it is also possible to perform an evaluation wherein several values are used and the measurement value is used in evaluating the maximum temperature when a measurement is taken with probe cover or protective film, and correspondingly to perform an evaluation wherein a mean value is used when a measurement is taken without probe cover or protective film.

Overall, in the use of an ear thermometer it has proven to be advantageous to terminate the measurements after expiration of a specified period of time which is of the order of magnitude of 4 to 5 seconds, approximately. Inserting the probe into the ear cools the ear locally. This cooling takes place after some time. Advantageously, therefore, the measurement process is terminated before such cooling produces a faulty measurement result.

Accordingly, in a further advantageous feature, for example, a measurement process may be aborted after the specified time period has expired.

In other embodiments, a warning signal indicative of the need to clean the device will be issued when no probe cover is installed on the thermometer. In this manner an operator is informed of a previous use of the infrared thermometer either without probe cover or with probe cover, and of the need for cleaning before any further measurements are taken. The signal warns of the risk of measurement errors due to a potentially contaminated optical system or the prior used probe cover; however, for the signal to occur it is necessary for the device to have detected that the measurement lies in the temperature range of the body temperature, which as a rule is only possible if the probe is introduced into the ear. Following cleaning of the probe's window upon a faulty measurement, a test measurement is first taken. This test cycle is repeated upon each measurement taken without probe cover.

For a perfect measurement, the test measurement requires either a healthy person having no elevated temperature or a calibrating device (black body). It is then necessary for the measurement to lie in a prior known temperature range of preferably at least between 36 and 37.5° C. If the temperature to be measured is outside this range, either approach is possible, that is, non-clearing of the device and its remaining in the test mode or, on the other hand, clearing of the device regardless of temperature.

The warning signal may be given in the form of a display, a red indicator lamp with suitable lettering, or an audible signal, for example.

In yet another embodiment, a warning signal is to be issued also when a prior used probe cover is about to be used for another measurement. The user is thus alerted to the possibility of a contaminated probe cover, enabling him to take steps to prevent the potential transmission of diseases. Accordingly, when the sensor is actuated by a probe cover, when a measurement is subsequently taken and later another measurement is taken without the sensor having received another pulse, a warning signal is produced to inform the user of the fact that the probe cover has been used twice. The prerequisite for the issuance of a warning signal is that the temperature lie in the range of the human body temperature during temperature measurement. Any other measurements lying outside this temperature range will not give rise to a warning signal because it is then assumed that these readings are taken outside the human body so that no contamination occurs. Temperature measurements on the surface of the human body are below 36.5° C., for example.

An embodiment of the present invention will be described in the following with reference to the accompanying drawings. In the drawings,

BRIEF DESCRIPTION OF THE FIGURES

FIG. 2 is a diagram illustrating a process sequence for the evaluation of a signal in an infrared thermometer which is operable both with and without probe cover or protective film;

FIG. 3 is a diagram illustrating a variation of the process sequence of FIG. 2; and FIG. 4 is a schematic view of a clinical infrared thermometer having a probe according to FIG. 1 and an evaluation unit according to the process sequence of FIG. 2 or 3.

DETAILED DESCRIPTION OF SPECIFIC EMBODIMENTS OF THE INVENTION

Figure 1:
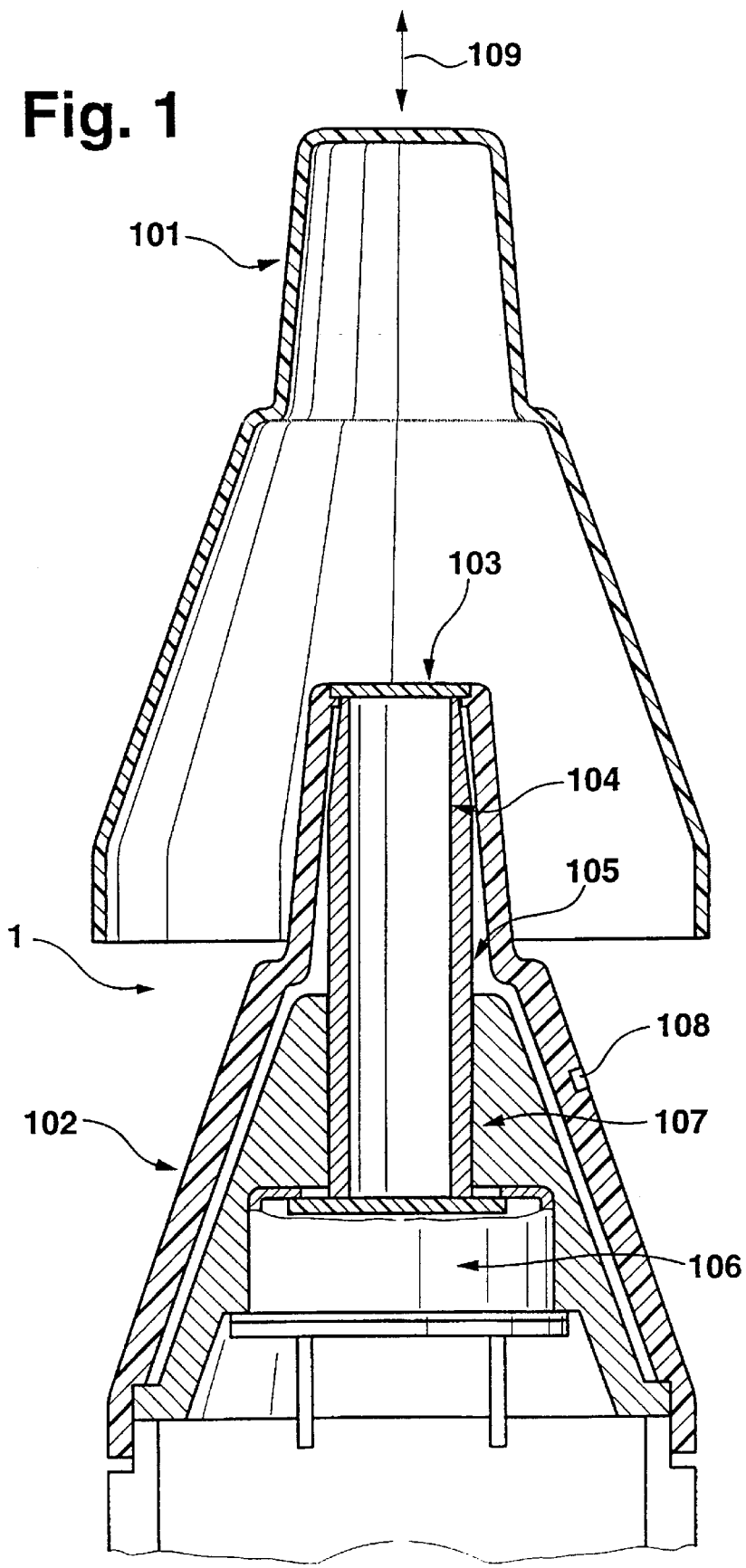
FIG. 1 is a view of a probe of an infrared thermometer.

Referring to FIG. 1, there is shown a possible embodiment of a probe 1 of a clinical infrared thermometer that is placed in a person's ear for taking a temperature reading. The probe 1 is suitable for use both with and without the probe cover or protective film 101 installed.

This enables the probe 1 to be used in a device which does not provide the use of probe covers or protective films 101 mounted over the probe 1. Equally, this probe may be utilized to advantage in a device enabling a measurement to be taken both with and without the probe cover or protective film 101 installed.

The outer wall 102 of the probe 1 is made of a plastics material. At the tip of the probe 1 is a window 103 that is transparent to infrared radiation. This window 103 blends smoothly with the outer wall 102, enabling contaminations to be removed with ease.

The material of the window 103 is advantageously selected such that very little absorption or emission occurs in the wavelength range covered by the sensor 106. Otherwise heating of the window 103 during the measuring operation would cause an emission of infrared radiation and corrupt the measurement result unless provisions were made to compensate for this effect. Possible materials for the window 103 include, for example, germanium, gallium arsenide, zinc selenide, chalcogenide glasses, oxygen free silicon, polyethylene, polypropylene or copolymers of polyethylene and polypropylene. Whichever material is selected, the wavelength range under evaluation has to be restricted to the transmission band of the material of the window 103. For gallium arsenide and a variety of chalcogenide glasses, a thermopile detector with a band filter for 4 to 15 $\mu$m, for example, may be used as sensor 106. For germanium and zinc selenide, the wavelength range may be increased to 4 to 23 $\mu$m and 4 to 20 $\mu$m, respectively. In a further embodiment, the sensor 106 is configured as a pyroelectric sensor.

The probe 1 further includes an optical waveguide 104 for guiding the infrared radiation to the sensor 106 after it has passed the window 103.

In order to avoid an excessive temperature differential between the optical waveguide 104 and the sensor 106 and also within the sensor 106, the optical waveguide 104 and the sensor 106 are thermally insulated against the outer wall 102 of the probe 1 by an air gap 105 among other things. Further, the area of mechanical contact of the outer wall 102, the window 103 and the optical waveguide 104 is as small as possible in order to reduce the flow of heat at this location as much as possible.

Moreover, a thermal mass 107 is arranged in the area of the optical waveguide and the sensor. This thermal mass may be a metal block, for example. It acts to reduce temperature variations with time as well as temperature gradients.

When a probe cover or protective film 101 is installed, it is not the full amount of incident infrared radiation that is transmitted, but respective portions thereof are reflected and absorbed. Still further, the probe cover or protective film 101 emits infrared radiation itself, depending on the temperature. Advantageously, therefore, the presence of a probe cover or protective film 101 is detected, and the measured temperature signals are then evaluated correspondingly. The presence of a probe cover may be detected, for example, by means of a capacitive, optical, magnetic or mechanical detector 108. This detector is advantageously accommodated in the outer wall 102 of the probe 1.

As becomes further apparent from FIG. 1, the probe cover or protective film 101 is installed on and lifted off the probe 1 in accordance with the arrow 109.

As becomes apparent from FIG. 2, in the evaluation of the sensor signal an appropriate allowance can be made for whether or not a probe cover or protective film is mounted over the probe.

At the beginning of a measurement, a check is first made in step 201 to see whether or not a probe cover or protective film is installed over the probe.

If it is established that a probe cover or protective film is installed, the signal is evaluated in accordance with a step 202. To compensate for the reduced transmission due to the presence of a probe cover, it suffices in the simplest case to multiply the sensor signal by a corresponding correction factor. This correction factor is of the order of about 1.08 to 1.2 for thin polyethylene or polypropylene film material. Where applicable, this correction factor may also be determined in dependence upon the ambient temperature and/or the temperature of the object being measured.

If no probe cover or protective film is installed, the signal evaluation takes place in accordance with a step 203.

In accordance with step 301, for example, the signal evaluation may take place such that during a first period of time which is typically of the order of 1 s or 2 s an evaluation of the measurement signal is not performed in order to derive therefrom an absolute value of the temperature to be measured. By this means it is possible to avoid measurement errors in the event of the user failing to properly position the thermometer within this first time period.

This first time period may be a preset fixed value or it may be determined, for example, by the characteristic of the sensor signal.

This first time period starts advantageously with the actuation of a button or a switch of the thermometer. Having this first time period start when a temperature rise can be concluded from the sensor signal may also be contemplated. When the thermometer is placed in the ear, the detected temperature initially rises until the measurement process has built up to a level at which the actual temperature is measured. Accordingly, this first time period may start when the detected temperature shows such a rise.

The determination of the length of this first time period by the signal characteristic may be advantageously performed by evaluating the rise of the measured temperature with time. During the time when the measurement process is in a transient state, the temperature experiences a relatively steep rise. A criterion for the end of the transient state consists in that the variation of temperature with time is smaller than or equal to zero. The criterion for the end of the first time period may then consist in that the first derivative of the temperature with respect to time is below a predetermined threshold value, for example, smaller than or equal to zero.

Advantageously, this approach for determining the length of the first time period may be limited to measurements taken without probe cover or protective film. When a thermometer on which a probe cover or protective film is installed is placed in the ear, relatively intense heat develops in the probe cover or protective film at the beginning of measurement. As a result, infrared energy is again radiated off the probe cover or protective film. The temperature rise with time thus does not enter a point of "saturation" but continues its rise, though in a less distinct fashion. A criterion for the end of the first time period may then not be derivable with sufficient accuracy.

The possibility also exists to make the first time period dependent on the presence or absence of a probe cover or protective film.

The evaluation in accordance with step 302 may then be made, for example, by picking up several measurement values and by further evaluating the measurement value that corresponds to the maximum temperature. It proves an advantage in this method that it does not require the user to hold the thermometer in the correct position at a particular moment.

This prevents the occurrence of measurement errors should the user hold the thermometer too far away from the point of measurement. If the signal measured at such an instant were evaluated, a temperature lower than the one actually prevailing would be measured.

Advantageously, therefore, the suppression of signal evaluation for the determination of an absolute temperature during the first time period according to step 301 could be omitted because resulting measurement errors cannot occur with this evaluation method.

Alternatively, the signal evaluation in step 302 may also be performed by picking up measurement values during a specified interval following which a mean value of these measurement values is formed in the evaluation. It shows to advantage that the above-described errors may be likewise avoided. The specified interval may be of the order of magnitude of some seconds, in particular from two to four seconds. It is particularly advantageous in this method to leave the measurement values unconsidered during the first time period according to step 301, thereby preventing them from corrupting the measurement result. In this event, therefore, the specified interval succeeds the first time period.

Overall, in the use of an ear thermometer it has proven to be advantageous to terminate the measurements after expiration of a specified period of time which is of the order of magnitude of 4 to 5 seconds, approximately. Inserting the probe into the ear cools the ear locally. This cooling takes place after some time. Advantageously, therefore, the measurement process is terminated before such cooling produces a faulty measurement result.

Accordingly, in a further advantageous feature, for example, a measurement process may be aborted after the specified time period has expired.

FIG. 4 shows a clinical infrared thermometer having a probe according to FIG. 1 and an evaluation unit 402. In this evaluation unit 402 which may be a controller, for example, signal evaluation advantageously takes place in accordance with the process sequence of FIG. 2 or 3. The evaluation unit 402 receives the signal from the detector 108. This detector 108 has already been described in connection with FIG. 1. Following signal evaluation, a display 403 is correspondingly driven by the evaluation unit 402.

In order to allow the user sufficient time for installation of a probe cover 101 after the thermometer is switched on, or for substitution of a new probe cover 101 for a used probe cover 101 prior to using the clinical thermometer, a further feature provides for the device to be ready for operation not until after a preset time period. When no probe cover or the same probe cover is to be used, a warning signal will not be issued until after a specified, where applicable, adjustable delay interval. For this purpose, delay intervals from three to five seconds, for example are sufficient. If the absence of the probe cover 101 continues to be established upon the expiration of such a delay interval, the first warning signal will notify the user that a probe cover 101 should be fitted over the window or the radiation entrance opening of the probe 1.

If no probe cover 101 is installed, the detector 108 will record the condition "probe cover not installed", delivering this signal to the evaluation unit 402 as a result of which the lamp or light-emitting diode lights up or flashes, providing a clear warning signal. This indicates to an operator either that no probe cover is mounted over the housing section or that the probe cover is not properly seated onto the forward cylindrical housing section, involving the risk of a corrupted temperature measurement due to potential contamination, with the temperature value then determined lying approximately in the range of the human body temperature. In a particular further feature, another light-emitting diode is provided indicating to the operator generally that no probe cover is installed, whilst the first light-emitting diode signals to the operator that a measurement has been taken in the range of the body temperatures without probe cover, therefore signaling, in addition to the information that the measurement value may be incorrect, the need for cleaning the radiation entrance opening to avoid subsequently a corrupted temperature measurement, for example, with a replaced probe cover.

On the other hand, a warning signal will be issued also in cases where a meaningful temperature value which is greater than 36.5° C., for example, is measured, but without the use of a new probe cover 101. In this event, the warning signal indicates that the detector 108 has not recorded a replaced probe cover so that sanitary conditions cannot be assumed or the measurement result is potentially corrupted by a contaminated probe cover.

What is claimed is:

1. An infrared thermometer, in particular a clinical thermometer, comprising a probe (1) in which an infrared sensor (106) and an optical waveguide (104) are arranged and on which a probe cover or protective film (101) is mountable, with a detector (108) detecting the conditions of the probe cover or protective film (101) as "installed" or "not installed", and with an evaluation unit (402) for the signals supplied by the infrared sensor (106) and the detector (108), said optical waveguide (104) being sealed tight in an end area by means of a window (103) transparent to infrared radiation, and during a temperature measurement the evaluation unit (402) performs the evaluation of the signal supplied by the infrared sensor (106) according to either a first or a second approach (202, 203) depending upon whether the signal supplied by the detector (108) indicates that the probe cover or protective film is "installed" or is "not installed".

2. The infrared thermometer as claimed in claim 1, wherein the outer wall (102) is made of a plastics material and that the window is made of at least one of the materials selected from the group consisting of germanium, gallium arsenide, zinc selenide, chalcogenide glass, silicon, polyethylene, polypropylene or copolymers of polyethylene and polypropylene.

3. The infrared thermometer as claimed in claim 2, characterized in that an air gap (105) is provided in the interior of the probe (i) between the optical waveguide (104) and the outer wall (102).

4. The infrared thermometer as claimed in claim 1 wherein an air gap (105) is provided in the interior of the probe (1) between the optical waveguide (104) and the outer wall (102).

5. The infrared thermometer as claimed in claim 1 claims, wherein at least one thermal mass is provided in the area of the optical waveguide (104) and/or the infrared sensor (106), that the thermal mass (107) is connected to the optical waveguide (104) and the infrared sensor (106), and that the thermal mass is formed by a metal block.

6. A method of evaluating the signal supplied by an infrared sensor of an infrared thermometer, in particular for measuring human body temperature, in which the infrared thermometer comprises a detector for the conditions of probe cover or protective film "installed" or "not installed" and an evaluation unit for determining the temperature based on the detector signal, the method comprising performing a measuring operation also when no probe cover or protective film is installed, and making an appropriate allowance, by a correspondingly different signal evaluation in the evaluation unit, for the infrared radiation that is consequently more intensive than when a measurement is taken with the probe cover or protective film installed.

7. The method as claimed in claim 6, wherein the different signal evaluation comprises multiplying the measured signal by a specified factor in dependence upon whether or not a probe cover or protective film is installed.

8. The method as claimed in claim 7, characterized in that no evaluation of the received signal is made as yet at the beginning of the measuring operation during a first predetermined time period.

9. The method as claimed in claim 7, characterized in that several measurement values are picked up during a measuring operation, and that in the evaluation of the received signal the measurement value is referred to for evaluation that corresponds to the maximum temperature.

10. The method as claimed in claim 7, characterized in that, upon initiation of a measuring operation, measurement values are picked up during a specified interval of time, and that for the determination of the temperature a mean value of these measurement values is formed.

11. The method as claimed in claim 7, characterized in that a warning signal is produced if, on a temperature measurement taken without probe cover or protective film, a measurement value is established that lies in the range of the human body temperature.

12. The method as claimed in claim 7, characterized in that a warning signal is produced if, on a first temperature measurement taken with the probe cover or protective film installed, a temperature value is established that lies in the range of the human body temperature, and if, with the probe cover or protective film continuing to be installed, a further temperature measurement is taken in which a temperature value lying in the same range is established.

13. The method as claimed in claim 6, wherein the different signal evaluation comprises multiplying with a variable factor depending upon whether or not a probe cover or protective film is installed, said factor being determined in dependence upon the ambient temperature and the temperature of the object being measured.

14. The method as claimed in claim 13, characterized in that no evaluation of the received signal is made as yet at the beginning of the measuring operation during a first predetermined time period.

15. The method as claimed in claim 6, wherein no evaluation of the received signal is made as yet at the beginning of the measuring operation during a first predetermined time period.

16. The method as claimed in claim 6, wherein several measurement values are picked up during a measuring operation, and that in the evaluation of the received signal the measurement value is referred to for evaluation that corresponds to the maximum temperature.

17. The method as claimed in claim 6, wherein, upon initiation of a measuring operation, measurement values are picked up during a specified interval of time, and that for the determination of the temperature a mean value of these measurement values is formed.

18. The method as claimed in claim 6, wherein a warning signal is produced if, on a temperature measurement taken without probe cover or protective film, a measurement value is established that lies in the range of the human body temperature.

19. The method as claimed in claim 18, wherein the warning signal is indicative of the need to clean the probe's entrance area.

20. The method as claimed in claim 6, wherein a warning signal is produced if, on a first temperature measurement taken with the probe cover or protective film installed, a temperature value is established that lies in the range of the human body temperature, and if, with the probe cover or protective film continuing to be installed, a further temperature measurement is taken in which a temperature value lying in the same range is established.

* * * * *